United States Patent [19]

Denton et al.

[11] Patent Number: 6,041,043
[45] Date of Patent: Mar. 21, 2000

[54] SONET PATH/ATM PHYSICAL LAYER TRANSMIT/RECEIVE PROCESSOR

[75] Inventors: Claude Denton, Portland; Donald C. Kirkpatrick; Samuel J. Peters, both of Beaverton, all of Oreg.

[73] Assignee: Tektronix, Inc., Wilsonville, Oreg.

[21] Appl. No.: 08/736,074

[22] Filed: Oct. 25, 1996

[51] Int. Cl.[7] .................................................. H04L 12/56
[52] U.S. Cl. .......................................... 370/254; 370/395
[58] Field of Search .................................... 370/254, 255, 370/256, 258, 395, 401, 402, 404, 465, 469, 470, 471, 474; 395/200.5, 200.51, 200.6, 200.8; 359/109, 115, 117, 147, 154; 709/220, 221, 222, 230, 250

[56] References Cited

U.S. PATENT DOCUMENTS

| | | | |
|---|---|---|---|
| 5,341,376 | 8/1994 | Yamashita | 370/466 |
| 5,485,456 | 1/1996 | Shtayer et al. | 370/395 |
| 5,537,412 | 7/1996 | Shima et al. | 370/401 |
| 5,541,926 | 7/1996 | Saito et al. | 370/474 |
| 5,568,486 | 10/1996 | Huscroft et al. | 370/395 |
| 5,594,724 | 1/1997 | Akata et al. | 370/469 |
| 5,638,356 | 6/1997 | Hijikata | 370/395 |
| 5,706,285 | 1/1998 | Saijonmaa et al. | 370/395 |

FOREIGN PATENT DOCUMENTS

| | | | |
|---|---|---|---|
| 0705050 | 9/1995 | European Pat. Off. | H04Q 11/04 |
| 9624994 | 2/1995 | WIPO | H04J 14/08 |

*Primary Examiner*—Ricky Ngo
*Assistant Examiner*—Kwang B. Yao
*Attorney, Agent, or Firm*—Francis I. Gray

[57] ABSTRACT

A SONET path/ATM physical layer transmit/receive processor ASIC for OC-48 makes use of a 32-bit wide interface between a source/destination and the rest of the processor. Adjacent the interface is an ATM cell processor, and between the ATM cell processor and a transmission medium is a SONET payload processor. Selectors are located between the transmission medium and the SONET payload processor, the SONET payload processor and the ATM cell processor, and the ATM cell SONET path/ATM physical layer path, an ATM physical layer path or a fast FIFO buffer path according to the configuration of the selectors determined by user commands from a command logic circuit coupled to each of the interface, ATM cell processor and the SONET payload processor.

4 Claims, 2 Drawing Sheets

SONET PATH/ATM PHYSICAL LAYER TRANSMIT/RECEIVE PROCESSOR

BACKGROUND OF THE INVENTION

The present invention relates to telecommunications systems, and more particularly to SONET path/ATM physical layer transmit/receive processors implemented as application specific integrated circuits (ASICs) to provide a greatly increased data rate.

A SONET frame may be thought of as a three-dimensional array of bytes, or a data block, having length, width and depth. The length and width are referenced as rows and columns (9×90), and the depth is a number of pages determined by data width (48 for OC-48). The data rate is 125 microseconds per block. The first three columns, all rows and pages, are used for overhead management of the SONET frame, with a pointer at a known location within such overhead management data. The pointer indicates another column within the SONET frame that is one column wide, encompasses all rows and is one-third the depth of the SONET frame, with only the first page column containing path overhead data (the rest being stuffed). Thus it is one page deep for OC-1 and OC-3c and 16 pages deep for OC-48c. The SONET frame is a synchronized frame, the beginning of which may be indicated by a frame pulse.

ATM is an asynchronous data transmission system that is composed of 53-byte structures, referred to as cells. Each cell has a four-byte header and a one-byte header error checksum followed by 48 bytes of data. The ATM cells are inserted into the SONET frame for transport at contiguous locations excepting those locations reserved for frame and path overhead, as discussed above. Currently there exist OC-12 processors with 8-bit SONET and 16-bit ATM UTOPIA interfaces, i.e., a maximum depth of 12 pages, that provide a 622 Mb/sec data rate.

What is desired is a SONET path/ATM physical layer transmit/receive processor implementable on an ASIC that provides OC-48 capability, i.e., a data rate of 2.488 Gb/sec.

SUMMARY OF THE INVENTION

Accordingly the present invention provides a SONET path/ATM physical layer transmit/receive processor ASIC for OC-48 using 32-bit SONET and ATM UTOPIA interfaces. The transmit/receive processor makes use of a 32-bit wide UTOPIA interface between a source/destination and the rest of the processor. Adjacent the UTOPIA interface is an ATM cell processor, and between the ATM cell processor and a transmission medium is a SONET payload processor. Selectors are located between the transmission medium and the SONET payload processor, the SONET payload processor and the ATM cell processor, and the ATM cell processor and the UTOPIA interface so that the processor provides a SONET, a SONET path/ATM physical layer, an ATM physical layer or a fast FIFO buffer path according to the configuration of the selectors determined by user commands from a command logic circuit coupled to each of the UTOPIA interface, ATM cell processor and SONET payload processor.

The transmit processor receives 8-bit and/or 32-bit data at two UTOPIA interfaces and stores the data in respective data and header FIFOs according to an input control circuit which is controlled by a FIFO controller. The output from the UTOPIA interfaces is input via the selectors to either the ATM cell processor, the SONET payload processor or directly to the transmission medium according to the configuration input by the user via the control logic circuit. The ATM cell processor generates the HEC byte and idle cells when necessary, scrambles the data, introduces HEC errors if desired, and combines the header with the data at the output. The ATM output is input by the selectors directly to the transmission medium or to the SONET payload processor for incorporation into a SONET frame. The SONET payload processor prepares the frame and path overhead columns and inserts the ATM cells, depending upon the configuration, contiguously into the SONET frame. The SONET frame is output via the last selector to the transmission medium.

Likewise the receiver receives the data from the transmission medium, routes it via the selectors to either the SONET payload processor if the data are SONET frames, the ATM cell processor if the data are ATM cells, or the UTOPIA interface. The SONET payload processor strips the overhead information and provides the data to the ATM cell processor if the data are ATM cells or to the UTOPIA interface via the selectors. The ATM cell processor searches for the start of the ATM cells and descrambles the data to provide the output to the interface. The UTOPIA interfaces provide 32-bit and/or 8-bit output to the destination.

The objects, advantages and novel features of the present invention are apparent from the following detailed description when read in conjunction with the appended claims and attached drawing.

DESCRIPTION OF THE PREFERRED EMBODIMENT

Figure 1:
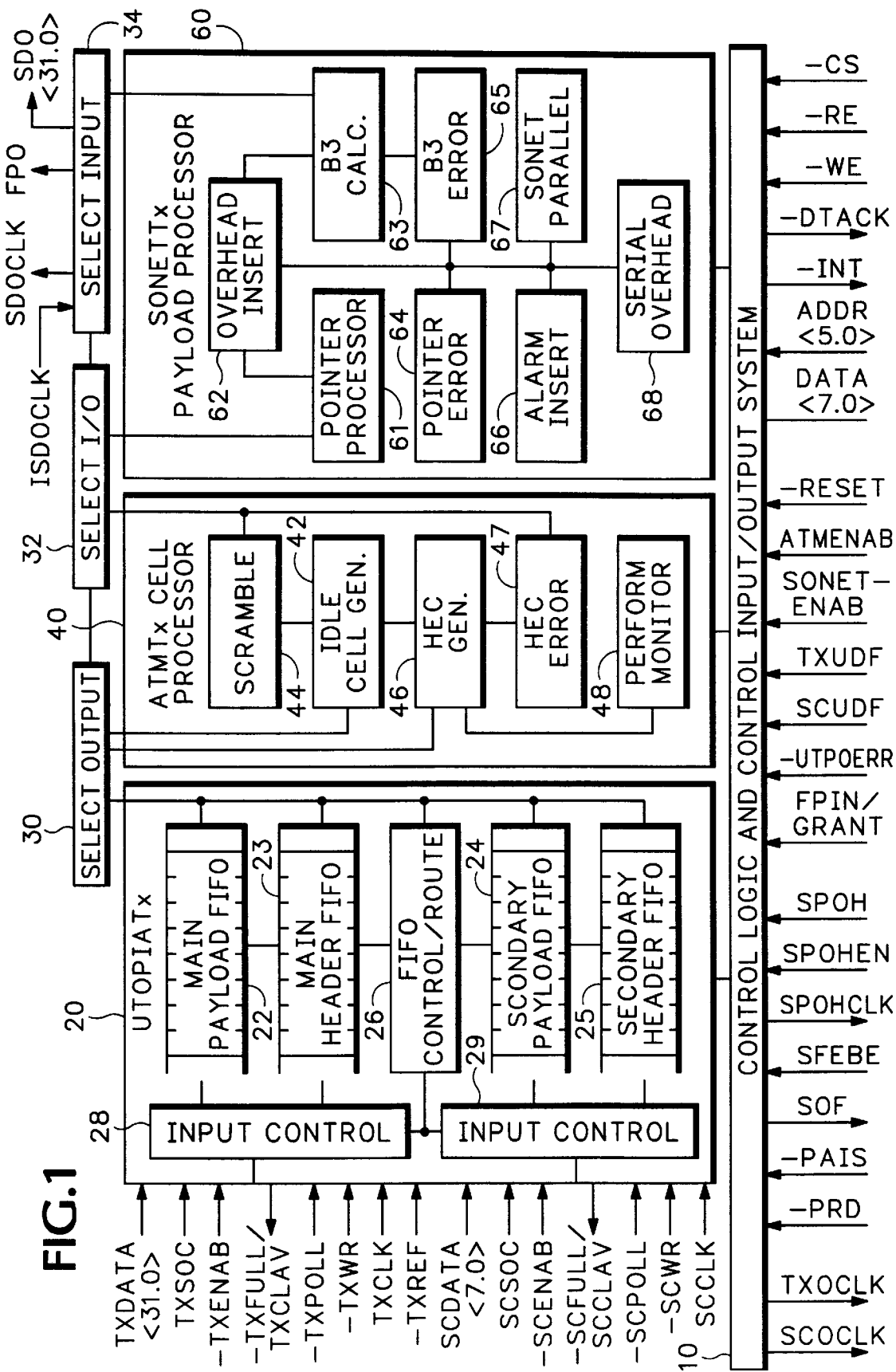
FIG. 1 is a block diagram view of a SONET path/ATM physical layer transmit processor according to the present invention.

Referring now to FIG. 1 a SONET path/ATM physical layer transmit processor (SPATT) is shown having an input interface 20, such as a UTOPIA interface, an ATM cell processor 40 and a SONET payload processor 60 in sequence with selectors 30, 32, 34 between the stages and at the output so that SONET and ATM functions may be enabled in any combination. For example the SPATT may be used as a complete ATM physical layer to the SONET path processor 40, as an STM-16c/STS-48c path processor only, an ATM transmission convergence sublayer processor only, or simply as a high speed first-in, first-out (FIFO) device.

The input interface 20 has a pair of main payload FIFOs 22, 23 with a 32-bit cell format and a pair of secondary payload FIFOs 24, 25 with an 8-bit cell format, one FIFO of each being for header information and the other for data. The 8-bit format may be like that described in the UTOPIA specification, with the 32-bit format being a further extension. When the ATM cell processor 40 is enabled, the main FIFOs 22, 23 allocate one word to the four header bytes, one word to four user defined (UDF) bytes in the UDF mode, one byte of which is the HEC byte, and twelve words to the 48 payload bytes per cell, for a total of 14 words per ATM cell. If the UDF mode is disabled, then the UDF word is not used and the total words per ATM cell are 13. The 32-bit data is provided over a data bus TXDATA. A TXSOC signal is asserted high during the cell header 32-bit word. A ~TXENAB signal is asserted low by an upstream device to indicate that TXDATA and TXSOC should be sampled on the next rising edge of the TXCLK. ~TXWR sets up the write of data into the main payload FIFOs 22, 23 just prior to asserting ~TXENAB. ~TXPOLL and ~TXFULL/TXCLAV are used to determine whether the main FIFOs are almost full or have space for a cell.

For the secondary interface 8-bit data is provided to the secondary payload FIFOs 24, 25 over SCDATA, with SCSOC being asserted during the first word of each new cell on SCDATA. ~SCENAB is asserted low by the upstream device to indicate that SCDATA and SCSOC should be sampled on the next rising edge of SCCLK. ~SCWR, ~SCPOLL and ~SCFULL/SCCLAV are comparable to ~TXWR, ~TXPOLL and ~TXFULL/TXCLAV. The secondary interface uses a 53-byte cell format when UDF mode is enabled, or a 52-byte cell format when UDF mode is disabled.

When only the SONET payload processor 60 is enabled the 32-bit data interface carries data from the synchronous payload envelope SPE of the incoming frame. In this mode TXSOC is asserted high during words containing path overhead. A ~TXREF signal is asserted low along with a word containing a J1 byte. When neither ATM nor SONET processors 40, 60 is enabled, the 32-bit interface carries raw data into the main FIFOs 22, 23. In this mode an SOC line is tied high, and an FPIN (Frame Pulse Input) signal is used as a GRANT to provide flow control on the outgoing data. The FIFOs behind the main interface are eight cells deep, and the secondary cell bypass pipe is four cells deep. Erroneous writes are reported on both interfaces as FIFO overflow. A FIFO control/router 26 controls the FIFOs 22, 23, 24, 25 and respective input controllers 28, 29 to route the input data according to the received commands to the appropriate FIFOs.

The output from the input interface 20 is input to the first selector circuit 30 which either routes the data around the ATM cell processor 40 if the ATM cell processor is not enabled or otherwise provides the data to the ATM cell processor which prepares the ATM cells for insertion into SONET frames. The ATM cell data is input to an idle cell generator 42 where an idle ATM cell is generated, if there is no complete ATM cell in the FIFOs 22, 23, 24, 25 of the input interface 20, to compensate for rate differences between the SONET and ATM data rates. The header word for each cell also is input to a HEC generator 46 which computes the HEC byte for insertion into the ATM cell. A HEC error circuit 47 may insert errors into the HEC byte for testing. The HEC byte may also be drawn from the UDF word, i.e., the fifth byte of the header may be the first byte of the UDF word. The ATM cell payload is scrambled by a scrambler circuit 44 and the header and UDF words are added at the output of the ATM cell processor 40. Performance monitoring counters 49 keep track of the total number of cells transmitted, the number of idle cells transmitted, and the number of cells transmitted from each input interface pipe. The payload scrambler circuit 44 and the HEC generator 46 may be disabled.

When the SONET path processor 60 is active, the output of the ATM cell processor 40, or the output from the input interface 20 when the ATM cell processor is inactive, goes via the second selection circuit 32 to the SONET path processor. Otherwise the data input to the second selection circuit 32 is transferred directly to the output selection circuit 34, bypassing the SONET path processor 60. In the ATM only mode FPIN may be used as a GRANT to provide flow control on the outgoing data.

The SONET payload processor 60 synthesizes STM-16c/STS-48c administrative units around ATM cells or raw payload data. Using either an internal free-running counter or an input frame pulse to demarcate frame boundaries, the SONET payload processor 60 generates blank section and line overhead, a valid pointer to the path overhead within the SPE, and concatenation pointers for the other pointers in a pointer processor 61. When the ATM cell processor 40 is active, the pointer starts as a constant value and stuff opportunities are not normally used. When only the SONET payload processor 60 is active, the pointer is aligned to the incoming data using the ~TXREF and TXSOC signals, and stuff opportunities are used based on FIFO under- or overfill. A mechanism is provided to allow user insertion of non-necessary pointer movements and arbitrary pointer values for test purposes.

Path overhead may be inserted by an overhead insertion circuit 62 from a serial stream overhead source 68, from internal registers 64–67 or, in SONET only mode, passed through from the data input. Far end block error (FEBE) count may also be inserted from dedicated pins. A B3 parity check byte is calculated by a B3 calculation circuit 63 and inserted into the proper position automatically. An error mask allows for the inversion of some B3 bits.

By default when the ATM cell processor 40 is enabled, only the words of the synchronous payload envelope SPE that do not contain path overhead come from the SONET payload processor 60. When the ATM cell processor 40 is disabled, the entire SPE is input through the input interface 20, with the TXSOC signal being used to indicate words containing path overhead and the ~TXREF signal being used to indicate the word containing the J1 byte. The frame generated in SONET/ATM mode includes fifteen stuff bytes per row for the path overhead column pages after the first page, as described in the standards. The frame passed in SONET mode contains whatever POH format is present in the input data stream. The SONET data outputs include a 32-bit synchronous output bus SDO, a frame pulse output FPO that signals the start of a new frame of SONET data and an output clock SDOCLK. An input clock ISDOCLK provides timing for the SONET/ATM processing circuitry.

A control logic and I/O system circuit 10 provides the command and control for the SPATT. The control circuit 10 interacts with a microprocessor (not shown) which provides ~CS, ~RE, ~WE commands together with an internal SPATT register address ADDR and DATA. The SPATT provides ~DTACK and ~INT responses to acknowledge read or write accesses and to get the microprocessor's attention. A SONET path overhead enable signal SPOHEN enables the use of a SONET path overhead data input SPOH as a source of path overhead on a byte-by-byte basis in response to an overhead sample clock SPOHCLK. A start of frame signal SOF indicates when a new frame's worth of data should be presented on SPOH. An error signal SFEBE accepts a pulse per error to be added to an outgoing far end block error signal FEBE. Finally a pair of pointer signals ~PAIS, ~PRDI also are provided for the SONET path overhead.

The control signals provided via the control circuit 10 include a reset ~RESET to restore the SPATT defaults, an ATM enable ATMENAB and a SONET enable SONETENAB signal for ATM cell insertion and SONET path processing, respectively, and user defined enables TXUDF, SCUDF to configure the main and secondary interface pipes for 14 or 13 word or for 53 or 52 byte formats. An interface error signal UTOPERR indicates detection of an interface handshaking or cell format error. The SPATT realigns its frame structure, if necessary, to synchronize to the input frame pulse FPIN, with ISDOCLK providing timing for this signal. The FPIN/GRANT signal is used as a grant for data output when in the ATM mode only. The SPATT provides valid data for sampling at the output SDO eleven cycles after a cycle in which GRANT is sampled high by the SPATT.

Figure 2:
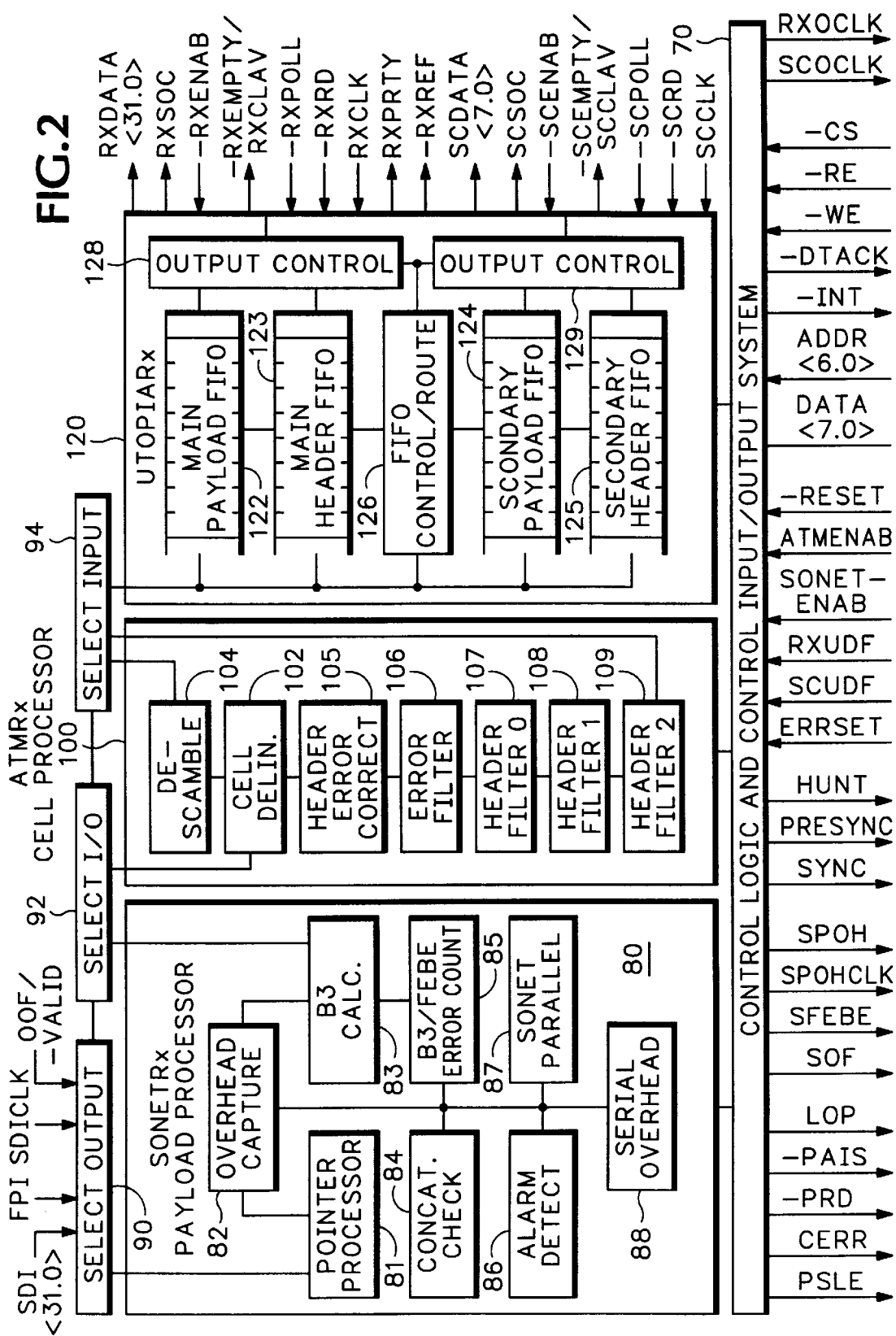
FIG. 2 is a block diagram view of a SONET path/ATM physical layer receiver processor according to the present invention.

Referring now to FIG. 2 a SONET path/ATM physical layer receive processor SPATR is shown which implements the SONET and ATM functions necessary to recover individual ATM cells from an incoming SONET STM-16c/STS-48c administrative signal entering through a 32-line channel SDI. A first selector 90 receives the 32-bit SONET data SDI, the flame pulse signal FPI, the SONET data clock SDICLK and a valid data signal OOF/~VALID. The first selector 90 routes the SONET data to a SONET payload processor 80 if the processor is enabled by a SONET enable command SONETENAB via a control logic and I/O system 70. The SONET payload processor 80 performs termination of the path overhead of the incoming signal including pointer processing, path overhead processing and path overhead output. Otherwise the SONET data is input from the first selector 90 to a second selector 92, bypassing the SONET payload processor 80. The second selector 92 also has as an input from the SONET payload processor 80, and provides an output either to a third selector 94 or to an ATM cell processor 100 depending upon whether the ATM cell processor is enabled by an ATM enable command ATMENAB via the control logic and I/O system 70. The ATM cell processor 100 performs cell delineation, HEC correction, cell payload descrambling, unassigned and programmable cell filtering and programmable cell diversion. The third selector 94 also has as inputs outputs from the ATM cell processor 100 and provides an output to an output UTOPIA interface 120. The output UTOPIA interface 120 in response to read enable, read poll and read commands ~RXENAB or ~SCENAB, ~RXPOLL or ~SCPOLL, ~RXRD or ~SCRD and a read clock RXCLK or SCCLK provides either 32-bit output data RXDATA or 8-bit output data SCDATA as well as a cell status indicator ~RXEMPTY/RXCLAV or ~SCEMPTY/SCCLAV and an overhead indicator RXSOC or SCSOC. Thus the SONET and ATM functions may be enabled in any combination so the SPATR may be used as a complete SONET path to ATM physical transport layer, an STM-16c/STS-48c path processor only, an ATM transmission convergence sublayer processor only, or simply as a high speed FIFO.

A pointer processor 81 in the SONET payload processor 80 receives the 32-bit SONET data from the first selector 90 and gains synchronization with the input data using the frame pulse signal which is aligned with the first word in the SONET frame. The pointer processor 81 finds and decodes the one valid pointer of the concatenated input signal and verifies that all other pointer locations are filled with the concatenation indicator, signalling an error condition if they are not. An overhead capture circuit 82 extracts the path overhead data based upon the valid pointer, and the path overhead data is then processed by respective concatenation check 84, alarm detect 86, B3/FEBE error count 85, SONET parallel 87 and serial overhead 88 circuits. All overhead bytes are made available as a serial stream. Also path RDI and FEBE are extracted from the G1 byte, and an accumulated FEBE count and filtered path RDI indicator are made available. The B3 parity is checked each frame and compared by a B3 calculator circuit 83 to the transmitted value in the next frame, with a B3 accumulated error count being maintained. The C2 byte is monitored to detect unassigned path indications and unstable path signal labels. Loss of pointer LOP, path alarm indicator signal ~PAIS, path remote defect indication ~PRDI, concatenation error CERR and path signal label error PSLE outputs are provided via the control logic and I/O system 70. The serial overhead outputs provided via the control logic and I/O system 70 are the serial overhead stream SPOH, the overhead clock SPOHCLK, a B3 error signal SFEBE, and a start of frame signal SOF.

When the ATM cell processor 100 is enabled, then the second selector 92 passes only the words of the synchronous payload envelope from the SONET payload processor 80 that do not contain path overhead. When the ATM cell processor 100 is disabled, the entire SPE is made available via the second and third selectors 92, 94 to the output interface 120, with the RXSOC line being used to indicate words containing the path overhead and the ~RXREF line being used to indicate the word containing the J1 byte. The path overhead POH for an STM-16c/STS-48c signal is defined to include the 15 stuff bytes per row described in the standards.

The ATM data from the second selector 92 is input to a cell delineation circuit 102 that uses HEC-based search and hunt/presync/sync states as described in the appropriate standard, which states are provided via the control logic and I/O system 70 as HUNT, PRESYNC and SYNC. In all states but the HUNT state the cell payload data is input to a descrambler circuit 104. Also a header correct circuit 105 optionally corrects cells with single-bit header errors. An error filter 106 maintains the standards-defined header error correction state machine and provides four options for filtering cells with detected errors from the main data stream. The user may choose to filter out all cells received with header errors, all cells with uncorrectable (multi-bit) header errors as well as cells with correctable (single-bit) header errors that arrive in the detection state, only cells with uncorrectable errors, or no errored cells at all. The cells that are filtered out may either be diverted to the secondary data pipe in the output interface 120 or dropped.

Three programmable cell header filters 107, 108, 109 remove cells with specified headers from the main data stream. These filters may be disabled, set to divert cells to the secondary data pipe in the output interface 120, or set to drop cells outright. One of these filters may be used to drop unassigned cells. Counters in the respective filters accumulate the total number of cells received, the number of cells dropped or diverted due to error, the number of cells passed with corrected headers, and the number of cells diverted or dropped by each filter block.

When the SONET payload processor 80 is enabled, the input to the ATM cell processor 100 comes from it via the second selector 92. Otherwise the ATM cell processor 100 takes the 32-bit SDI channel as its input via the second selector 92, and uses the OOF/~VALID signal to determine which words belong to the ATM stream. Whenever the ATM cell processor 100 is enabled, its output goes to the output interface 120 via the third selector 94. Cell payload descrambling and header error correction may be disabled, and the use of the specified copolynomial $(x^6+x^4+x^2+1)$ in the HEC calculation may also be disabled.

The output interface 120 has both main stream FIFOs 122, 123 and secondary stream FIFOs 124, 125 which each present cells supporting all modes. The main FIFO 122, 123 cell format is 32-bit wide, and the secondary FIFO 124, 125 cell format is 8-bit wide. The 8-bit format is described in the appropriate specification, such as the UTOPIA specification, and the 32-bit format is a further extension. FIFO overflow is reported and a count of cells dropped due to overflow is maintained.

When the ATM cell processor 100 is enabled, the 32-bit cell format allocates one word to the four header bytes, one word to the four UDF bytes with byte 1 containing the HEC byte, and 12 words to the 48 payload bytes per cell. The SPATR may also be set to remove the UDF word to lower the data rate at the output interface 120. A setting in the control registers of the SPATR allows UDF byte 2 to be used to report errors detected in the header of each cell, i.e., a "0" is no errors are detected, a "1" if a single-bit error is detected, a "2" if a single-bit error is detected and corrected, and a "3" if a multi-bit error is detected. Otherwise UDF bytes 2–4 are filled with values read from writable registers in the SPATR. RXSOC is asserted high during the first 32-bit word of the cell. If the SONET payload processor 80 is enabled, the ~RXREF signal is a reference clock, otherwise ~RXREF is held high.

When only the SONET payload processor 80 is enabled, the 32-bit main pipe carries data from the SPE of the incoming SONET frame. In this mode the RXSOC line is asserted during words containing path overhead, and the ~RXREF signal is asserted low along with the word containing the J1 byte. When neither ATM nor SONET processors 100, 80 are enabled, the 32-bit main pipe carries data from the SDI channel inputs, with the OOF/~VALID signal serving to enable input on that interface. The RXPRTY signal always carries the odd parity over the active bits of the data bus, with the main FIFOs 122, 123 being 8 cells deep and the secondary FIFOs 124, 125 being 4 cells deep without RXREF and RXPRTY signals.

Thus the present invention provides a SONET path/ATM physical layer transmit/receive processor in the form of a pair of ASICs that use a 32-bit interface with a transmission medium, an ATM cell processor and a SONET payload processor together with appropriate selectors and a control logic circuit to provide a plurality of options that include OC-48 at 2.488 Gb/sec.

What is claimed is:

1. A SONET path/ATM physical layer transmit/receive processor system comprising:
   a transmission medium;
   a transmitter having
      an input interface having first and second input terminals for coupling 32-bit and 8-bit input data signals respectively to 32-bit and 8-bit pipelines, and having an output terminal coupled to the output of the 32-bit and 8-bit pipelines,
      a first transmit selector having an input terminal coupled to the output terminal of the input interface, and having first and second output terminals,
      a transmit ATM cell processor having an input terminal coupled to the first output terminal of the first transmit selector, and having an output terminal,
      a second transmit selector having a first input terminal coupled to the second output of the first transmit selector, a second input terminal coupled to the output terminal of the transmit ATM cell processor, and first and second output terminals,
      a transmit SONET payload processor having an input terminal coupled to the first output terminal of the second transmit selector, and having an output terminal,
      a third transmit selector having a first input terminal coupled to the output terminal of the transmit Sonet payload processor, a second input terminal coupled to the second output terminal of the second transmit selector, and an output terminal coupled to the transmission medium, and
      a transmit control circuit coupled to the input interface, the transmit ATM cell processor and the transmit SONET payload processor for selectively determining a data path for the input data signals from the inputs of the input interface via the first, second and third transmit selectors to the output terminal of the third transmit selector; and
   a receiver having
      a first receive selector having an input terminal coupled to the transmission medium, and having first and second output terminals,
      a receive SONET payload processor having an input terminal coupled to the first output terminal of the first receive processor, and having an output terminal,
      a second receive selector having a first input terminal coupled to the second output terminal of the first receive selector, having a second input terminal coupled to the output terminal of the receive SONET payload processor, and having first and second output terminals,
      a receive ATM cell processor having an input terminal coupled to the first output terminal of the second receive selector, and having an output terminal,
      a third receive selector having a first input terminal coupled to the second output terminal of the second receive selector, having a second input terminal coupled to the output of the receive ATM cell processor, and having an output terminal,
      an output interface having an input terminal coupled to the output terminal of the third receive selector, and having first and second output terminals to provide respectively 32-bit and 8-bit output data signals from 32-bit and 8-bit pipelines coupled between the input terminal and the respective output terminals, and
      a receive control circuit coupled to the receive SONET payload processor, the receive ATM cell processor and the output interface for selectively determining a data path from the input terminal of the first receive selector to the output terminals of the output interface.

2. A SONET path/ATM physical layer transmit processor comprising:
   an input interface having first and second input terminals for coupling 32-bit and 8-bit input data signals respectively to 32-bit and 8-bit pipelines, and having an output terminal coupled to the output of the 32-bit and 8-bit pipelines;
   a first transmit selector having an input terminal coupled to the output terminal of the input interface, and having first and second output terminals;
   a transmit ATM cell processor having an input terminal coupled to the first output terminal of the first transmit selector, and having an output terminal;
   a second transmit selector having a first input terminal coupled to the second output of the first transmit selector, a second input terminal coupled to the output terminal of the transmit ATM cell processor, and first and second output terminals;
   a transmit SONET payload processor having an input terminal coupled to the first output terminal of the second transmit selector, and having an output terminal;
   a third transmit selector having a first input terminal coupled to the output terminal of the transmit Sonet payload processor, a second input terminal coupled to the second output terminal of the second transmit selector, and an output terminal; and a transmit control circuit coupled to the input interface, the transmit ATM cell processor and the transmit SONET payload processor for selectively determining a data path for the input data signals from the inputs of the input interface via the first, second and third transmit selectors to the output terminal of the third transmit selector.

3. A SONET path/ATM physical layer receive processor comprising:

a first receive selector having an input terminal for receiving a data signal, and having first and second output terminals;

a receive SONET payload processor having an input terminal coupled to the first output terminal of the first receive processor, and having an output terminal;

a second receive selector having a first input terminal coupled to the second output terminal of the first receive selector, having a second input terminal coupled to the output terminal of the receive SONET payload processor, and having first and second output terminals;

a receive ATM cell processor having an input terminal coupled to the first output terminal of the second receive selector, and having an output terminal;

a third receive selector having a first input terminal coupled to the second output terminal of the second receive selector, having a second input terminal coupled to the output of the receive ATM cell processor, and having an output terminal;

an output interface having an input terminal coupled to the output terminal of the third receive selector, and having first and second output terminals to provide respectively 32-bit and 8-bit output data signals from 32-bit and 8-bit pipelines coupled between the input terminal and the respective output terminals; and a receive control circuit coupled to the receive SONET payload processor, the receive ATM cell processor and the output interface for selectively determining a data path for the data signal from the input terminal of the first receive selector to the output terminals of the output interface.

4. A SONET path/ATM physical layer transmit/receive processor comprising:

an interface having a first side for coupling to a source/destination of data in 32-bit and 8-bit formats and a second side;

an ATM cell processor for processing ATM physical layer data having a first side and a second side;

a SONET payload processor for processing SONET frame data having a first side and a second side; and a plurality of selectors coupled in series so that an output from one is an input to the next one in the series with the first in series also being coupled between the second side of the interface and the first side of the ATM cell processor, the next in series also being coupled between the second side of the ATM cell processor and the first side of the SONET payload processor, and the next again in series also being coupled between the second side of the SONET payload processor and a transmission medium so as to configure a data path between the source/destination and the transmission medium through or around the ATM cell processor and/or the SONET payload processor according to input commands.

* * * * *

UNITED STATES PATENT AND TRADEMARK OFFICE
CERTIFICATE OF CORRECTION

PATENT NO : 6,041,043
DATED : March 21, 2000
INVENTOR(S) : Claude Denton, Donald C. Kirkpatrick and Samuel J. Peters It is certified that error appears in the above-identified patent and that said Letters Patent are hereby corrected as shown below:

Column 1, after line 3 insert the following:

"STATEMENT REGARDING FEDERALLY SPONSORED RESEARCH OR DEVELOPMENT

This invention was made with Government support under Agreement No. N00014-94-C-2168 awarded by Department of Navy. The Government has certain rights in the invention."

Signed and Sealed this

Twenty-second Day of May, 2001

*Attest:*

NICHOLAS P. GODICI

*Attesting Officer*   *Acting Director of the United States Patent and Trademark Office*